United States Patent
Wiseman

(10) Patent No.: US 7,301,789 B2
(45) Date of Patent: Nov. 27, 2007

(54) ADJUSTABLE SPEED DRIVE PROTECTION

(75) Inventor: Jason Cornelius Wiseman, Guelph (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 357 days.

(21) Appl. No.: 10/924,694

(22) Filed: Aug. 24, 2004

(65) Prior Publication Data

US 2006/0044711 A1    Mar. 2, 2006

(51) Int. Cl.
*H02H 7/122* (2006.01)
*H02H 3/22* (2006.01)
*H02M 1/12* (2006.01)

(52) U.S. Cl. .............. 363/56.12; 363/40; 361/111
(58) Field of Classification Search .......... 361/111; 363/50, 56.12, 40
See application file for complete search history.

(56) References Cited

U.S. PATENT DOCUMENTS

| | | | | |
|---|---|---|---|---|
| 4,672,520 | A | 6/1987 | Ueda et al. | 363/37 |
| 4,757,435 | A | 7/1988 | Wood et al. | 363/54 |
| 4,884,182 | A | 11/1989 | Ando et al. | 363/37 |
| 5,047,909 | A * | 9/1991 | Hosoda | 363/40 |
| 6,366,483 | B1 * | 4/2002 | Ma et al. | 363/37 |
| 6,477,067 | B1 | 11/2002 | Kerkman et al. | 363/41 |
| 6,541,933 | B1 | 4/2003 | Leggate et al. | 318/599 |
| 6,617,821 | B2 | 9/2003 | Kerkman et al. | 318/801 |
| 2002/0190684 | A1 * | 12/2002 | Tankard | 318/701 |
| 2003/0169013 | A1 | 9/2003 | Kadah | 318/727 |

FOREIGN PATENT DOCUMENTS

JP            03195374       *   8/1991

OTHER PUBLICATIONS

"Power Quality Considerations for Adjustable Speed Drive Applications", *Electric Power Research Institute*, (1996), 1-14.
"Powerflex 7000: Your Success Depends On It", *Powerflex 7000; Reliability Starts Here, Allen-Bradley*, (5 pages).
Bilgin, Hazim F., et al., "A Unity-Power-Factor Buck-Type PWM Rectifier for Medium/Hight-Power DC Motor Drive Applications", *IEEE Transactions on Industry Applications*, vol. 38, No. 5, (Sep./Oct. 2002), 1412-1425.

* cited by examiner

*Primary Examiner*—Michael Sherry
*Assistant Examiner*—Scott Bauer
(74) *Attorney, Agent, or Firm*—Catherine Klima-Silberg; Alexander R. Kuszewski

(57) ABSTRACT

A protection scheme to protect pulse width modulated drives is described. The scheme is implantable in both hardware and software and combinations thereof. The semiconductor devices of the drive are protected from transient signals such as power line spikes and loss of line. The present scheme uses an adaptive technique to determine the normal or steady state distortion (transients and harmonics) value in an unfiltered power signal. The present distortion value is compared to the normal distortion. If the present distortion exceeds the steady state value by a given amount, then the drive is placed in freewheel mode to protect the semiconductor devices in the drive.

27 Claims, 7 Drawing Sheets

ADJUSTABLE SPEED DRIVE PROTECTION

TECHNICAL FIELD

The present application relates to protection of adjustable speed drives. More particularly, the present application relates to methods, structures and apparatus for protecting adjustable speed drives that interface a load with a power source.

TECHNICAL BACKGROUND

An adjustable speed drive ("ASD") controls the power supplied from a source, such as a utility or generator, and a motor. However, the ASD, as well as power electronics in general, suffer when the power supplied to the ASD is of poor quality. Poor power quality is sometimes represented as transients or harmonics in the power signal, such as overvoltages, voltage sags, and brief interruptions. One cause of transients is the addition of capactive devices, such as other ASDs or capacitor banks, on the power supply side of the ASD. Poor power quality can result in device, such as power semiconductor device, failures in the ASD. This in turn results in undesirable down time for the motor and the application of the motor. In medium voltage applications, a motor being down results in lost productivity for a manufacturing plant. Power quality considerations are described in Power Quality Considerations for Adjustable Speed Drive Applications, published by the Electric Power Institute, which is hereby incorporated by reference. Accordingly, there is a need to protect ASDs from damage due to transients in the power supplied from the source.

SUMMARY

An adjustable speed drive protection device includes a drive protector that monitors a power signal and switches the drive to a protection mode when a severe transient event is detected. In an option, the adjustable speed drive is a pulse-width modulated adjustable speed drive. The drive protector is adapted to transform the power signal to a vector representation in the synchronous reference frame. The vector representation is subjected to a high pass filter to remove a fundamental component of the power signal such that a transient component and normal background distortion passes the filter. A rectifier rectifies the transient component and normal background distortion to move the component and distortion into a positive reference frame. A peak detector determines a normal value for the rectified signal which is then subjected to a low pass filter adapted to output a steady state background distortion signal, which represents normal background distortion. A multiplier scales the steady state background distortion signal to prevent nuisance trips of the protection scheme. In an option, the circuit protector is adapted to correct the steady state background distortion signal for current demand by motor receiving the output signal. The circuit protector compares the corrected steady state background distortion signal to the rectified signal. The present scheme is adapted to detect harmonics or transients on a medium voltage utility line and protect symmetrical gate commutated thyristors in an inverter or rectifier.

The present scheme, in various aspects, is adapted to systems that include adjustable speed drives and methods that provide pulse width modulated drive signals to loads such as motors. Such systems may include an input filter connected to a power source, a rectifier connected to the input filter, an inverter connected to a motor, a dc link connecting the rectifier to the inverter, and a controller operably connected to the rectifier and the inverter. The controller includes a drive protection unit connected to the power source and adapted to sense transient events from the power source. The transient events include harmonics that may damage an adjustable speed drive. The drive protection unit is adapted to place the rectifier and the inverter in a protected state when a transient event occurs. In an option, this protective state includes placing the rectifier in a freewheel mode. In an option, this protective state includes placing the inverter in the freewheel mode. In an option, the protective state places the inverter in a pulse width modulated ("PWM") mode to facilitate rapid shutoff of the dc current In an option, the drive protection unit always places the rectifier in freewheel mode before the inverter. In an option, the drive protection unit is adapted to return the rectifier and the inverter to a normal operation mode after power from the transient event has dissipated. In an option, the drive protection unit returns the rectifier to normal operation before the inverter in a regeneration mode. In an option, the drive protection unit returns the inverter to normal operation before the rectifier in a motoring mode. In an option, the controller is operably connected to the symmetrical gate commutated thyristors of both the rectifier and the inverter to control conduction state of the thyristors.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
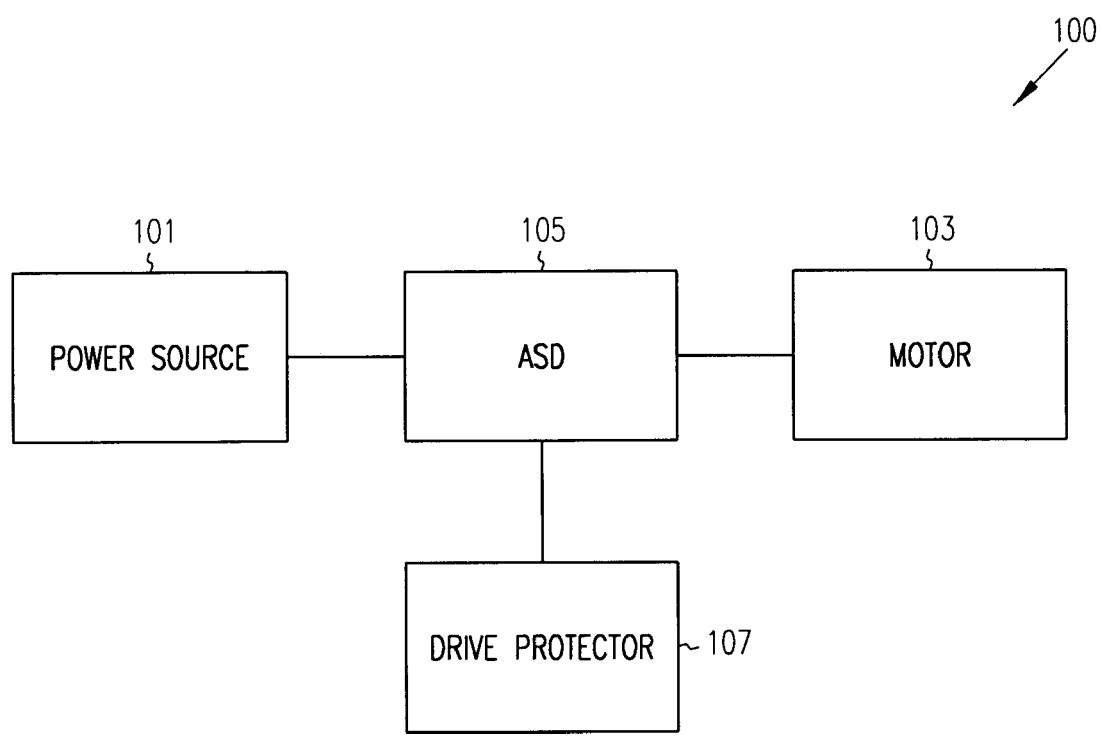
FIG. 1 illustrates a diagram of a system including an embodiment of the present invention.

The present application relates to systems, structures and methods related to adjustable speed drives. One example of a system 100 is shown in FIG. 1. System 100 includes, but is not limited to, a power signal source 101 electrically connected to a motor 103 through an adjustable speed drive ("ASD") 105. The power signal source 101 is a utility power source that produces a three phase power signal (at 60 Hz in North America) at various line voltages. It will be understood that the present system is adaptable to other frequencies, for example, 50 Hz. A source will have normal background distortion and at times may have harmonics that way be significant magnitude and damage components connected to the source. In one option, the power signal is in the range of 2400 to 6600 volts rms. Generally, ASD 105 uses pulse-width modulation (PWM) to rectify the incoming AC power to produce a constant DC level, and converts the constant DC level to AC drive signals that are supplied to the motor 103. The motor 103 receives three phase power from the ASD 105. In an option, the ASD 105 receives feedback signals from the motor 103, which feedback signals are used by the ASD to control its output signals to the motor. ASD 105 overcomes the shortcomings of operating induction motors directly on line voltage, and satisfies many of the requirements for speed control of motor 103. A drive protector 107 is connected to the ASD 105. Drive protector 107 senses transients, such as harmonics and background distortion, in the power signals and based on the sensed transients places the ASD 105 in a protection state to prevent damage to the ASD 105. Sources of transients can include the addition of a further drive on the power source bus, a harmonic filter on the bus, a power factor correction capacitor on the bus, or other devices brought on-line. At times the transients can reach twice the line voltage, which results in device failure with the ASD 105. The ASD 105 typically has no advance warning of a transient on the power bus. Since the ASD 105 has no advance warning of the transient, a method and structures for addressing the transients to protect devices in the ASD are described herein.

Figure 2:
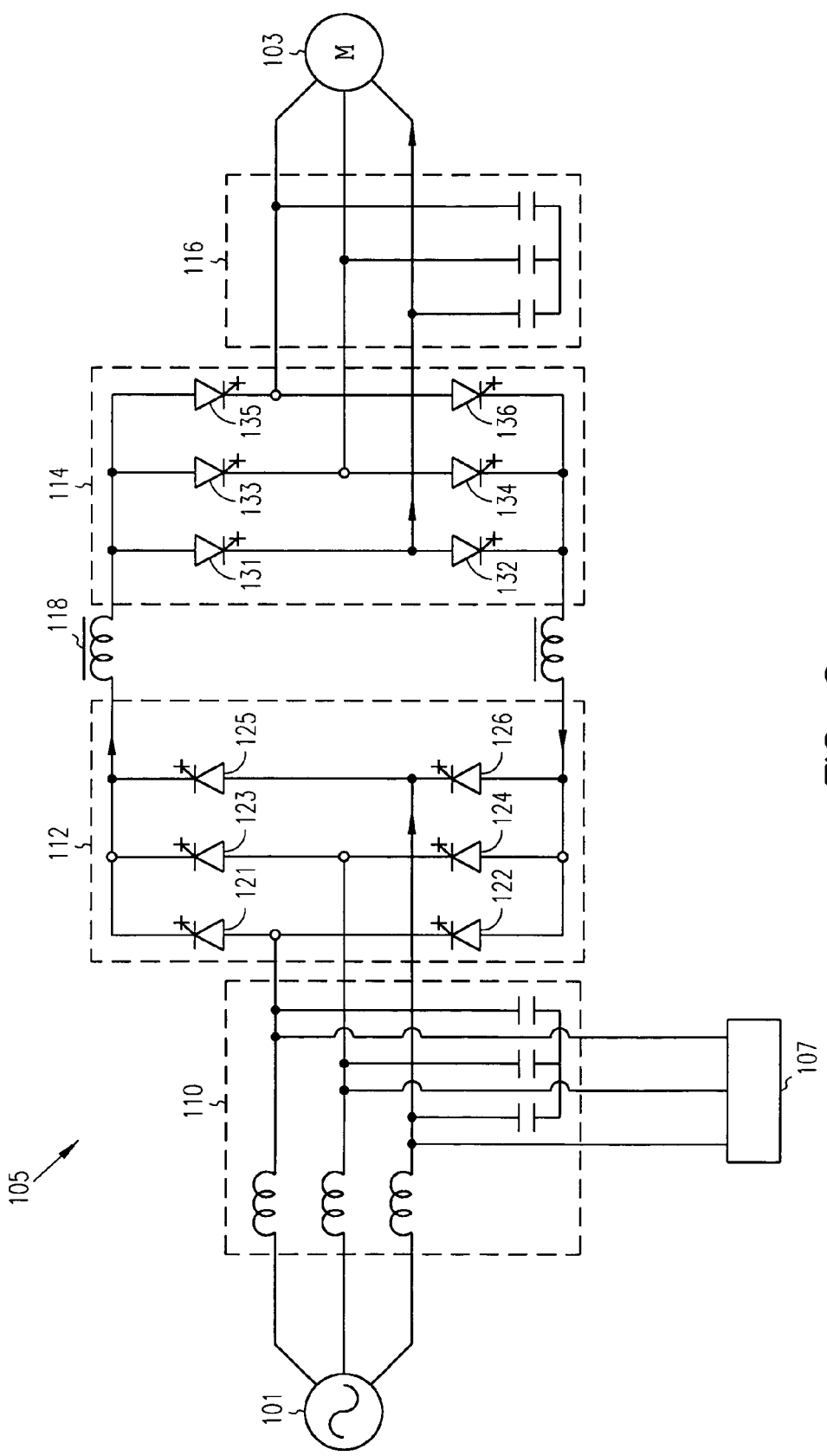
FIG. 2 illustrates a diagram of a system including an embodiment of the present invention.

FIG. 2 shows an ASD 105 connected between power signal source 101 and motor 103. ASD 105 has an input filter 110 connected to the power signal lines of three phase source 101. A rectifier 112 is connected to the input filter 110. An inverter 114 is connected to the rectifier 112 through a dc link inductor 118. An output filter 116 is connected to the inverter 114 and motor 103. The input filter 110 includes filters connected to each input line. Each filter includes an inductor and a capacitor connected to each line so as to provide the necessary filtering for the remainder of the ASD. However, when a large transient signal occurs on an input line from the source, the LC filter can undesirably go into oscillation, i.e., ringing which can result in over-voltages. Rectifier 112 includes three pairs of series connected switching devices 121-126. In an option, the devices 121-126 include rectifier switches. In an option, the devices are power rated semiconductors. A node intermediate the rectifier switches in a pair is connected to a power source line through filter 110. Inverter 114 includes three pairs of series connected switching devices 131-136. In an option, the devices 131-136 include inverter switches. In an option, the devices are power rated semiconductors. A node intermediate the inverter switches in a pair is connected to an output line connected to the motor 103 through output filter 116. In an option, the devices 121-126 are thyristor power semiconductors. In an option, the power semiconductors include an integrated gate drive. In an option, the power semiconductors are symmetrical gate commutated thyristors. In operation the rectifier devices 121-126 selectively conduct to provide pulse-width modulated signals that provide the required current in the dc link for the inverter devices 131-136. The inverter devices 131-136 selectively conduct to provide the desired drive signals to the load, i.e., the motor 103. A controller (not shown in FIG. 2) operates the devices 121-126, 131-136 in a gating pattern to provide the desired pulse width modulated drive signals. A gating pattern is the sequence in turning switching devices off (non-conducting) and on (conducting) to provide the desired drive signals, amplitude and frequency, to the load. The devices can block a significant voltage applied across the devices when they are not conducting and can handle the currents flow of a transient event from the source if the devices are already conducting. However, the devices are susceptible to device failure when the device switches from conducting state to a non-conducting state, and vise-versa, during a transient event. Accordingly, it is desired to protect the devices during such an event by preventing the devices from changing state as much as possible to avoid the high stress imposed on the devices during a transient event.

An example of a freewheel mode conduction pattern has the devices 125 and 126 in the rectifier 112 conducting and the devices 131 and 132 conducting on the inverter 114. That is, a serial connected pair of switching devices in the inverter and a serial connected pair of switching devices in the rectifier are conducting.

Figure 3:
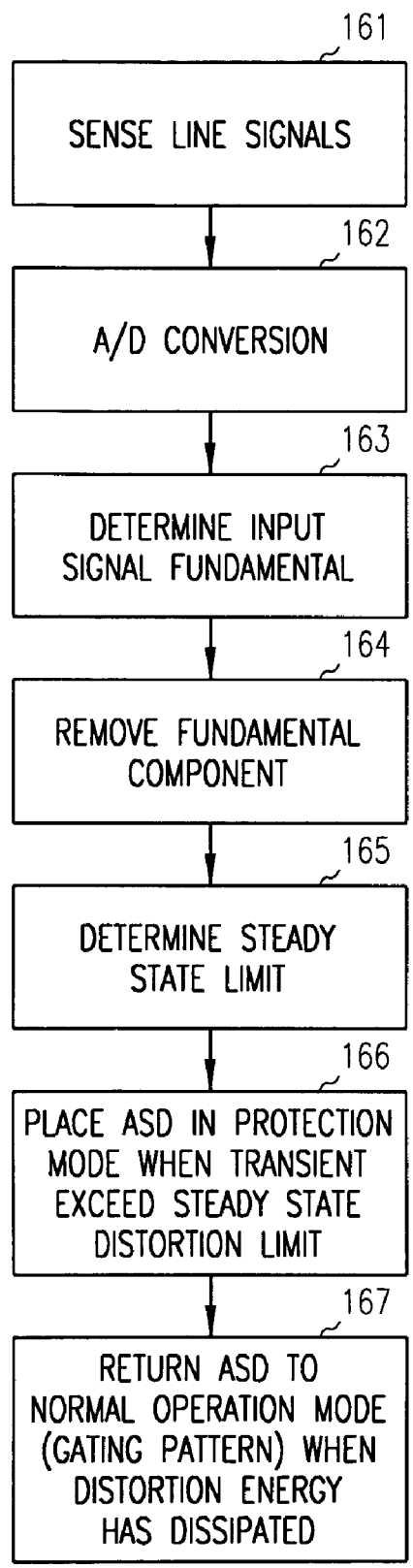
FIG. 3 illustrates a flow chart of an embodiment of the present invention.

FIG. 3 shows a flow chart view of protection method applied to the ASD 105 by the drive protector 107. Drive protector 107 is connected to each of the power lines in the input filter. In an option, the drive protector 107 is connected to the capacitors on each power line in the input filter. In an option, the drive protector 107 is connected at the power line inputs of the input filter. The input signals are sensed, step 161. The sensed signals are converted to digital signals, step 162. An input signal fundamental component is determined based on the input signals, step 163. The fundamental component is the desired power waveform. In an option, the input signals have a fundamental component in the range of about 2400 to 6600 volts. In North America, the fundamental power component is typically provided by a three phase 60 Hz power signal. The fundamental component is removed from the input signal, step 164, leaving a nonfundamental signal, which includes background distortion and, if any, harmonics. The steady state nonfundamental limit is determined, step 165, from the nonfundamental signal. The steady state nonfundamental limit represents a value of the steady state distortions or harmonics on the power signal line. A power line typically has an inherent amount of harmonics. Step 166 uses an adaptive determination technique that allows the steady state nonfundamental limit to vary over time. The adaptive technique produces a slowly downwardly varying and more quickly upwardly varying signal that represents the peak of the steady state nonfundamental (noise, distortion and harmonics) signals. The actual nonfundamental signal is compared to the steady state nonfundamental limit. If the nonfundamental signal exceeds the steady state nonfundamental limit, then the drive protector 107 places the ASD 105 in a protection mode, step 167. The protection mode is a freewheel mode as determined by the present state of the devices or switches 121-126, 131-136 in an option. The protector 107 tracks the current state of the devices 121-126, 131-136 and depending on which switches are currently conducting, the protector 107 selects the devices that will conduct during the protection state, i.e., freewheel mode. A freewheel mode is one where both of a series connected devices are conducting. For example, devices 121 and 122 are conducting at the same time. The drive protector 107 returns the ASD 105 to its operation state, i.e., it normal gating pattern, once the energy from the transient signal in the ASD 105 has dissipated, step 168.

Figure 4:
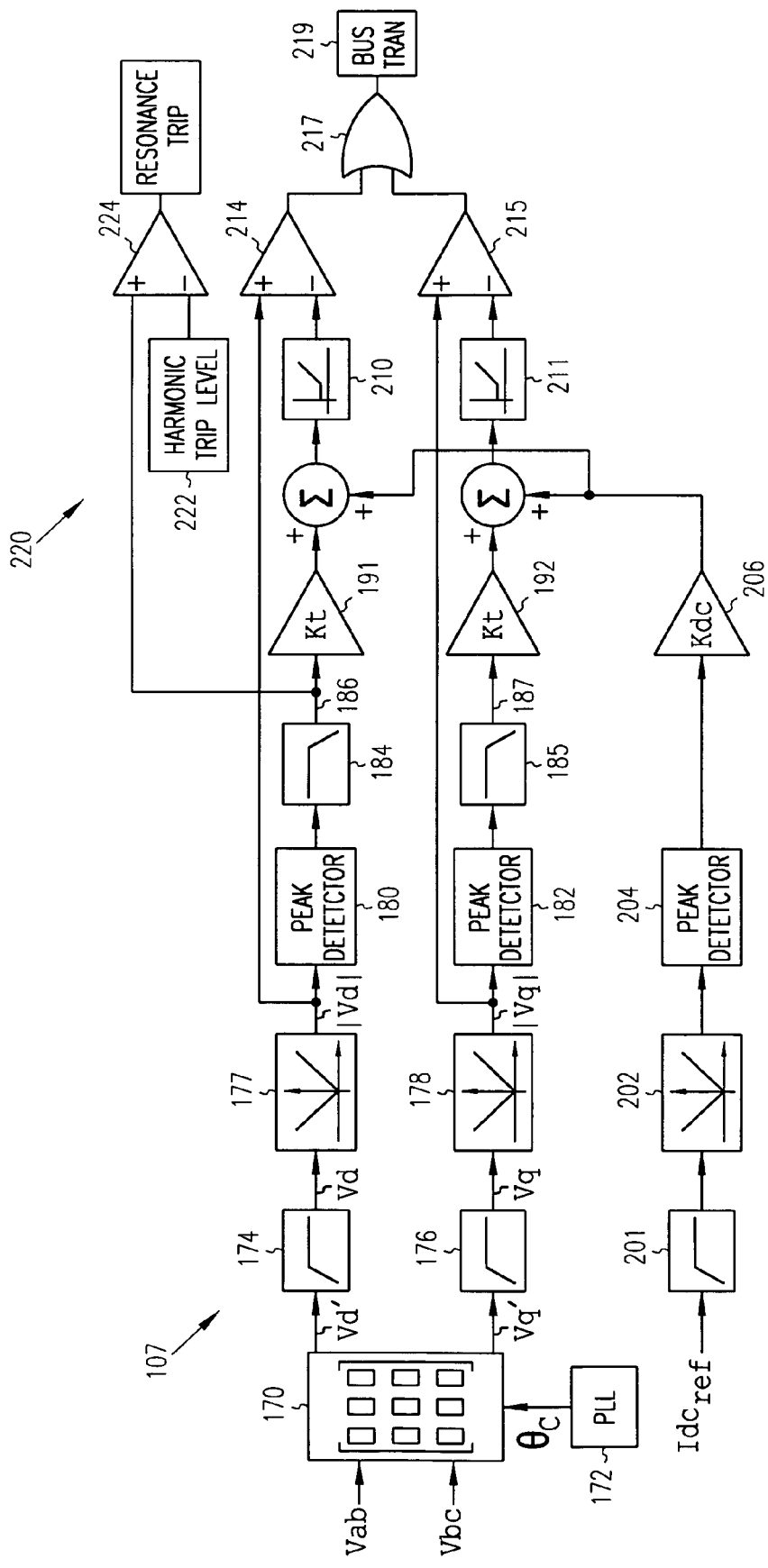
FIG. 4 illustrates a schematic representation of an embodiment of the present invention.

FIG. 4 shows a detailed schematic view of a portion of the drive protector 107. While FIG. 4 shows the features of the drive protector as discrete components, it will be recognized that the features could be combined in instruction sets with a processor. In a further option, features described herein are implemented in software. A vector rotator 170 receives input signals, which are digitally sampled signals from input filter. In an option, the input signals are digitally sampled signals representing the differences between two of the input lines and a third input line, e.g., $V_{ab}$, $V_{bc}$. Vector rotator 170 further receives a signal $\theta_C$ from phase lock loop circuit 172 to keep the vector rotator in phase with the power source 101 and/or the ASD 105. The input signals from the power source 101 are sinusoidal, medium voltage signals. The vector rotator 170 transforms the signals into a synchronous reference frame with a vector representation $V_d$, $V_{q'}$ of each sinusoidal input signal. The vector representation of the sinusoidal voltage signal has a fundamental dc component and a time-varying component of input signal. The time-varying component includes background distortion and harmonics, which are typically not a problem for devices in the ASD 105, and may include a transient event such as a voltage spike, which is problem for device in the ASD. A voltage spike may result from harmonics in the power signals. The resulting signals $V_d$, $V_{q'}$ are input into a high pass filter 174, 176, respectively. In an option, the high pass filters 174, 176 are first order filters with a cutoff frequency of about 5 Hz. High pass filters 174, 176 output signals $V_d$, $V_q$ with the dc component of signal $V_d$, $V_{q'}$ removed. Accordingly, $V_d$, $V_q$ represent the time-varying component of the input signals. As the input signals are sinusoidal, i.e., the signals vary from positive to negative, the remaining time-varying component signals $V_d$, $V_q$ are fully rectified by rectifiers 177, 178 to a positive value $|V_d|$, $|V_q|$, respectively. The rectified time-varying signals are input into a respective peak detector 180, 182 and fed forward to a respective comparator 214, 215. Each peak detector 180, 182 determines the normal operating state peak of the input signal's time-varying component (nonfundamental). In operation, an input signal will have some time-varying component, for example, due to harmonics on the utility line, which is not a transient event that will damage devices in the ASD 105. The peak is used to prevent improper activation of the drive protector 107 and improper placement of the ASD 105 in a protection state. The peak detectors 180 and 182 only detect and set a positive peak value which represents the peak amplitude of the time-varying signals $|V_d|$, $|V_q|$. The peak detector 180 or 182 is set so that it slowly reduces the peak and quickly increase the peak of the nonfundamental components based on prior sensed values. The output from the peak detectors 180, 182 are respectively input to low pass filters 184, 185. In an option, the low pass filters 184, 185 are first order filters with a cutoff frequency of about 0.25 Hz. The output signals 186, 187 from the low pass filters 184, 185 is a slowly changing signal that represents the peak amplitude of the nonfundamental in the input signals. These nonfundamentals are present in an input and are not of such a magnitude to damage devices in the ASD 105. The signals 186, 187 are used to set a varying trip setting that adapts to the system 100, and particularly to the ASD's normal state of operation. Signals 186, 187 are scaled by a constant Kt in multipliers 191, 192, respectively. Constant Kt is a selectable constant that represents the trip setting as a factor of the nominal peak voltage $V_d$ and $V_q$. In an option the constant Kt is set at three, which provides a fast response and assists in preventing nuisance (unwanted) trips. As used herein the term "trip" defines when the drive protector switches the ASD 105 to a protection state.

In parallel to the preceding, a further nuisance trip prevention variable is being determined based on the reference current (Idc_ref) demand from the motor 103 to the power source 101 through the ASD 105. The reference current Idc_ref is measured from the inverter to the 114 to the converter 112. The reference current Idc_ref is subsequently received by a high pass filter 201. Filter 201, in an option, is a first order filter with a cutoff frequency of about 5 Hz. Output from the filter 201 is fed to a rectifier 202, which in turn feeds the rectified signal to a peak detector 204. Output from the peak detector 204 is fed to a multiplier 206 to scale the signal by a constant Kdc. Constant Kdc is selected to desensitize the protector 107 to small variations in the current demands of the motor 103. Output from the multiplier is separately summed with the outputs from the multipliers 191, 192. The results of the summing process represent the minimum trip values 210, 211. These minimum trip values 210, 211 are respectively compared to the rectified time-varying signals $|V_d|$, $|V_q|$. Comparator 214 outputs a transient event signal if the rectified time-varying signals $|V_d|$ exceeds the minimum trip value 210. Comparator 214 outputs a transient event signal if the rectified time-varying signals $|V_q|$ exceeds the minimum trip value 211. Either of outputs from comparator 214 or 215 can indicate a transient event and based on either output, the drive protector 107 can switch the ASD 105 into a protection state. In an option and as shown in FIG. 4, the outputs of the comparators 214, 215 are input into an OR logic circuit 217 so that a single source line (bus) transient signal 219 results.

The above processes and structures address setting a trip level based on a severe transient signal spike, there is also a need to trip the protector 107 to move the ASD to a protection state during certain steady state resonances. A problematic steady state event can occur when the input filter 112 is tuned near the fifth harmonic. The causes the line current and the capacitor voltage to become distorted even when the ASD 105 is not running. This near resonance condition results in a large peak voltage in the input filter capacitor, which is not normally detected as a line over voltage. Almost any transient on the input line may result in device failure in the ASD 105. The above technique will be desensitized to transients if the steady state harmonic content is high. Accordingly, there is a need to provide a further protection scheme. Such a scheme 220 is shown in FIG. 4, wherein signal 186, which is the output from the low pass filter 184 and peak detector 180 is compared to a harmonic trip level 222. The harmonic trip level 222 is a programmable variable. Moreover, the comparator 224 includes a long delay to avoid incorrect nuisance trips.

Figure 5:
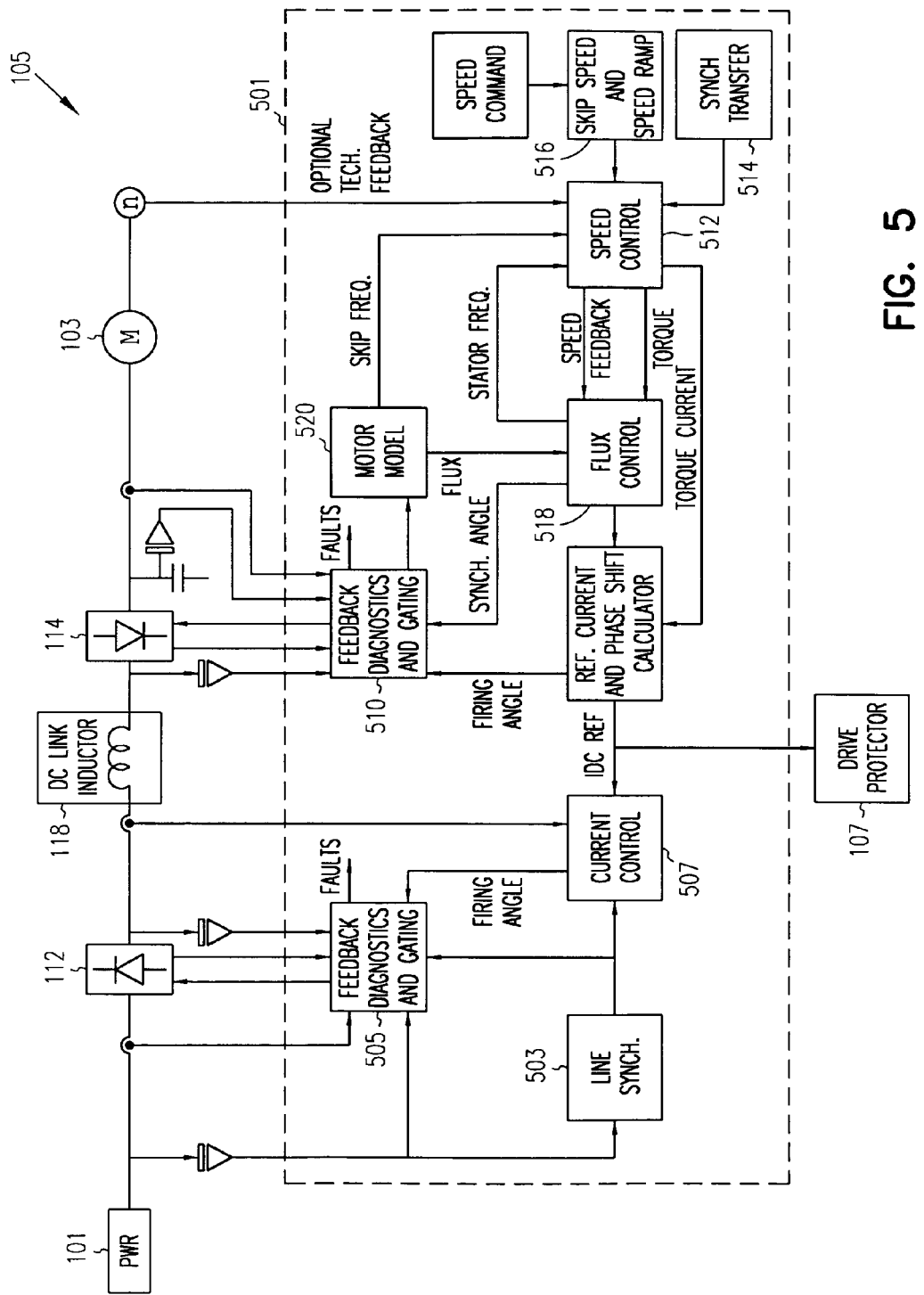
FIG. 5 illustrates details of the adjustable speed drive of an embodiment of the present invention.

FIG. 5 shows a schematic representation of portions of the ASD 105 that relate a controller 501 of the gates or switches 121-126, 131-136. The power source 101 provides power to the converter 112. Controller 501 samples the power line signals to provide line synchronization 503. A line side, feedback diagnostics and gating control 505 receives the sampled power signal and the line synchronization. The line synchronization 501 is further input into a current control unit 507, which provides a further input into line side control 505. Line side control 505 senses the output from the converter 112. Based on at least these inputs the line side control 505 controls which of the switches in the converter are conducting at any time and what the gating pattern of the converter should be. Current control 507 also receives a current reference signal $I_{dc\_ref}$ from the motor side of the system. $I_{dc\_ref}$ represents the current required by the motor at any given time. Current control 507 further outputs a firing angle signal to the line side control 505. Controller 501 further samples the signal on the inverter side of the dc link inductor 118 and the signal output by the inverter 114, which signals are input into a load side, feedback diagnostics and gating control 510. A speed control unit 512 receives signals from a synchronous transfer unit 514 and a speed variation unit 516. Speed control unit 512 sends a speed feedback signal and a torque signal to a flux control unit 518. Flux control unit 518 feeds a stator frequency signal back to the speed control unit 512. Flux control unit 518 feeds a synchronization angle signal to the load side control 510. Based on at least these inputs the load side control 510 controls which of the switches in the inverter 114 are conducting at any time and what the current gating pattern of the inverter should be. Load side control 510 further feeds signals into a load modeling unit 520. Load modeling unit 520 outputs a flux signal to the flux control unit 518 and a slip frequency signal to the speed control unit 512. The protector 107 receives current reference signal $I_{dc\_ref}$ from the load side of the controller 501.

In operation, the ASD 105 turns the devices 121-126 and 131-136 on in a specific pattern to rectify the three-phase input signal from a medium voltage power bus and output appropriate three-phase motor drive signal to a motor 103. Normal background harmonics or distortion in the steady state capacitor voltage in the input filter are present in the system. These harmonics and distortion are a result of harmonic or distortion pollution in the source from the utility. The drive protector 107 constantly sets the trip level based on the steady state distortion and harmonics. One source of a nonfundamental that may cause damage to the switching devices, e.g., devices 121-126 and 131-136 of the ASD 105, is when a capacitor bank or additional ASD is connected to the same medium voltage power bus. The drive protector 107 has no advance knowledge of the nonfundamental and, accordingly, the present invention is not limited to any particular source of a nonfundamental on medium voltage power bus. Nonetheless, the capacitor banks and additional ASDs are described to provide greater understanding of the environment in which the drive protector 107 operates. The initial in-rush of current into the capacitors of the capacitor bank or input filter of an ASD results in the line voltage on all three phases dipping to a very low value for a fraction of a cycle. Subsequent ringing and over-voltages occur on the input filter of the ASD 105. As a result a high voltage, for example, at least twice the normal operating voltage, is across the devices 121-126 and 131-136 of the ASD 105. The actual over-voltage value is dependent on the impulse response of the filter 112 and the angular position of the nonfundamental. If the rectifier devices are switched in their normal gating pattern during a particular over-voltage with a specific angular position of the nonfundamental signal, then the devices may be damaged. The most critical angular position for a nonfundamental signal spike is near the peak (positive or negative) of the fundamental signal. Moreover, the resonance caused by the ringing upsets the rectifier's dc voltage and hence there is a loss of control over the dc current. This can result in the undesirable shut down of or damage to the ASD 105. The drive protector 107 prevents switching at the high stress time by sensing the nonfundamental signal spike, i.e., transient event, and placing the ASD 105 in a protection mode including the rectifier in a freewheel mode and the inverter in a freewheel mode or phase shifted PWM mode for current source ASD. The drive protector 107 places ASD 105 in a protection mode including the rectifier and inverter in a protection mode of either shut off or a phase shifted PWM mode for voltage source ASD. The freewheel mode can be entered at any time in the gating pattern and isolates the dc-link from the power bus. A further benefit of the freewheel mode is that the devices in the off, non-conducting state are able to withstand twice the normal line voltage. The protector 107 detects a severe transient event in the power bus and places the ASD 105 in a protection mode before the ringing and overshoot occur. The protector 107 is sensitive enough to detect another drive or capacitor bank switching into the power bus, as well as loss of line. Moreover, the protector 107 further detects for certain steady state resonance that may damage the devices 121-126, 131-136.

As described herein, the drive protector 107 places the ASD 105 in freewheel mode when a transient event occurs. It is desirable to quickly place the ASD 105 in freewheel mode and return to normal operation of the ASD such that the motor 103 continues to operate and the manufacturing process that involves the motor 103 continues. In order to achieve this goal the dc current link should not be unpowered for a long or significant time period. That is, the protection mode should only last long enough to protect the device from the transient nonfundamental event. For example, the time period should not be longer than two cycles of the utility. In an option, the protection mode lasts between 30 to 50 milliseconds for a 60 Hz utility. As a result, action must be taken swiftly and in a particular order. Protector 107 continuously determines the appropriate freewheel pattern for the gates at any particular time. In an option the possible freewheel patterns are calculated ahead of time and stored. The freewheel gate pattern is linked to the presently enacted gate pattern in an option. That is, the freewheel gate pattern will use gates that are presently conducting. The freewheel gate pattern is linked to the next gate pattern in an option. The rectifier 112 must be placed in freewheel mode at the earliest opportunity. If possible, the protector 107 will immediately overwrite the present, normal gate pattern with the freewheel pattern. If the gates are currently blocked from changing to a new pattern, then the freewheel pattern will be loaded as the next gate pattern to be written onto the gates 121-126 with the duration of the present gate pattern be set as short as possible. That is, the present gate pattern is set at a minimum pulse width. The inverter 114 is commanded to go fire its protective pattern as soon as the transient is detected, however, the freewheel gate pattern can be written onto the devices 131-136 in the normal sequence (normal pulse width). The protection pattern for the inverter includes a freewheel mode for current source ASD that serves to shut off the dc-link current. The protection pattern for the inverter includes a PWM mode for a voltage source ASD. This results in the inverter 114 being in a protective mode slightly later than the rectifier 112. This order is desirable whether in motoring mode (the power source is driving the motor) or in regeneration mode (the motor is feeding current back to the source. It is noted that there is a slight increase in dc current in regeneration mode, however, this is acceptable situation to protect the gates 121-126 from failure. During the protection state, the controller 510 continues to calculate current demands of the motor 103. However, these demands are ignored with the ASD 105 in protection state.

It is further desired to automatically return the ASD 105 to its normal operation after the freewheel mode has withstood the transient event. In an option the control 501 includes a dc current regulator. The dc current regulator includes an integral portion which is reset to zero to erase the effects of the transient event. The return of the ASD 105 to a normal operating mode depends on the operating mode. In motoring mode, the inverter 114 returns to its normal gating pattern first. Thereafter, the rectifier 112 returns to its normal gating pattern. In regeneration mode, the rectifier 112 returns to its normal gating pattern first. Thereafter, the inverter 114 returns to its normal gating pattern. During a line loss, the shut off of the devices is delayed until the protector 107 determines that the dc current has been off for a period of time. In an option, the freewheel operation time is about 100 milliseconds to ensure that the dc current has sufficiently decayed. The protector 107 after this time period turns all devices 121-126, 131-136 off.

Figure 6:
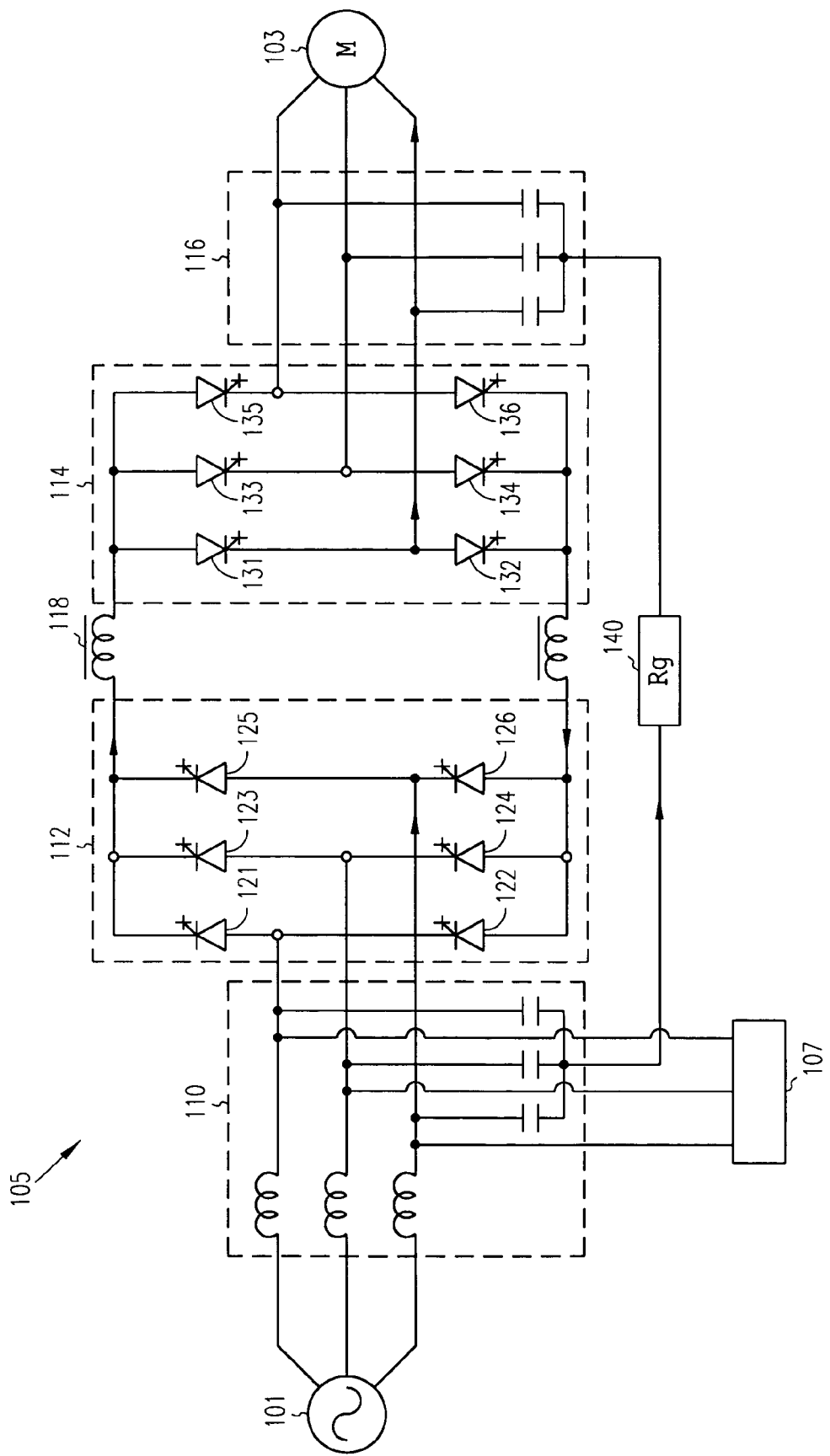
FIG. 6 illustrates a diagram of a system including an embodiment of the present invention.

FIG. 6 shows a further embodiment of the present invention that includes drive 105 that includes a resistor 140 connecting the input filter 110 to the output filter 116. Hence, resistor 140 provides a current path. This current path requires that both the rectifier 112 and inverter 114 not be in a freewheel, protection mode at the same time during a transient event. The rectifier 112 and inverter 114 each include a plurality of series connected devices 121-126 and 131-136. When a transient event is sensed using the structures and methods described herein, then the rectifier 112 is placed in a freewheel mode. The inverter 114 is set to a PWM pattern with a change in phase to produce a maximum dc voltage that forces the current in the capacitive link between the rectifier and inverter to essentially zero. For example, inverter devices 131, 132 selectively conduct to produce maximum positive dc voltage to facilitate a fast shut down of the dc link current. This scheme is particularly useful when the motor operates at high speeds and voltages so that it will supply the voltage required to block the current flow between the freewheel mode rectifier and high voltage state inverter during a sensed transient event.

Figure 7:
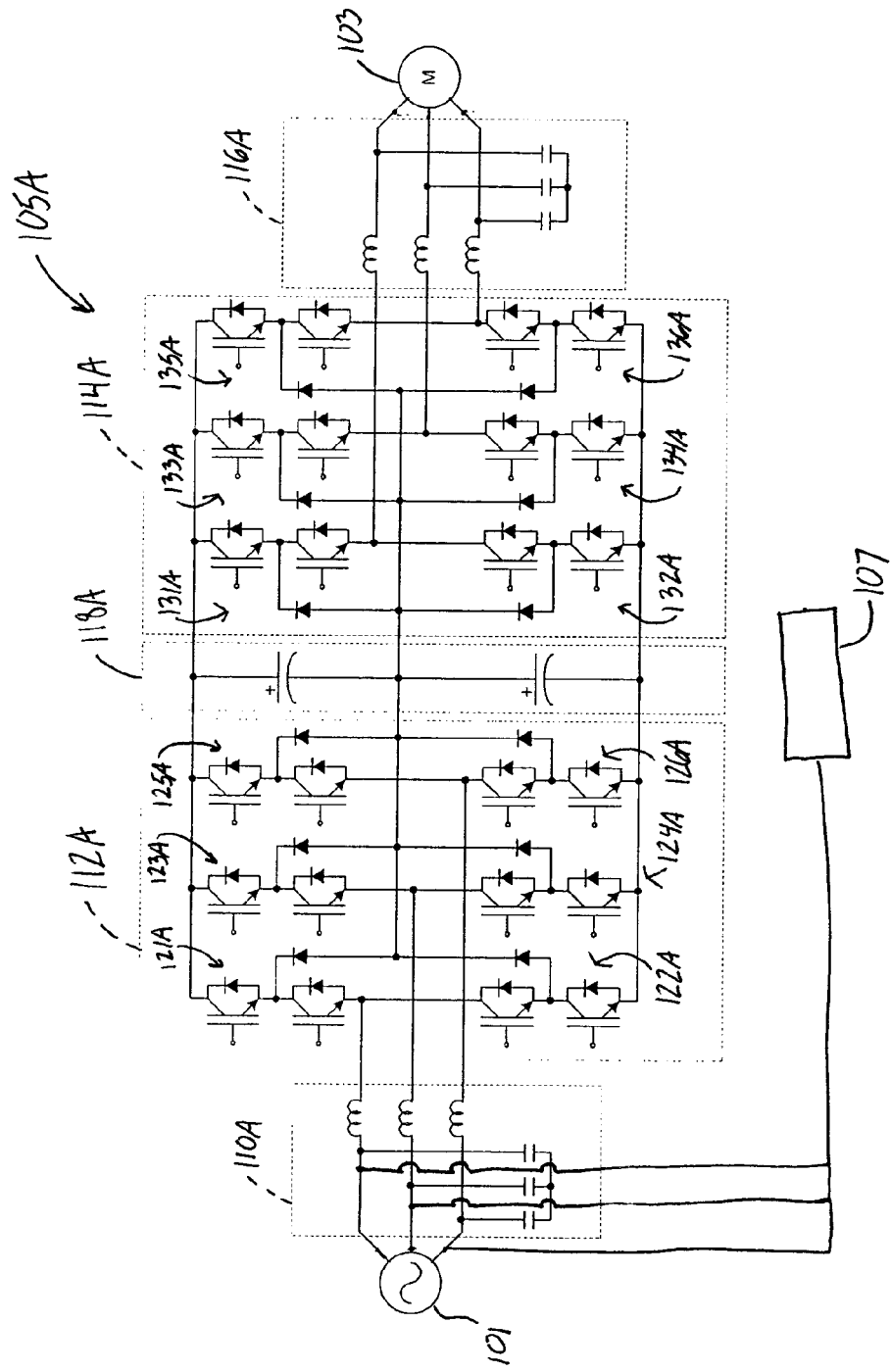
FIG. 7 illustrates a diagram of a system including an embodiment of the present invention.

FIG. 7 shows one embodiment of an adjustable speed drive 105A that is voltage source inverter. The ASD 105A include an input filter 110A connected to the three power signal lines of source 101 and rectifier 112A. An inverter 114A is connected to the rectifier 112A through a dc link 118A. An output filter 116A is connected to the inverter 114A and motor 103. The output filter 116A is optional in some applications. The input filter 110A includes filters connected to each input line. Each filter includes an inductor and a capacitor connected to each line so as to provide the necessary filtering for the remainder of the ASD. However, when a large transient signal occurs on an input line from the source, the LC filter can undesirably go into oscillation, i.e., ringing which can result in over-voltages. Rectifier 112A includes three pairs of series connected switching devices 121A-126A. In an embodiment, the devices 121A-126A include rectifier switches. In an embodiment, each device 121A-126A includes two series connected Insulated Gate Bipolar Transistors (IGBTs). The node intermediate each of these series connected Insulated Gate Bipolar Transistors is connected to an intermediate node of the dc link 118A. The dc link includes two series connected capacitors with the intermediate node being between the two capacitors. It is within the scope of the present invention to use other power-rated semiconductor switches in the rectifier or inverter. The inverter 114A mirrors the rectifier 112A in this embodiment. In operation the voltage across the dc link 118A is fixed and the current varies to supply the motor. A controller (not shown in FIG. 7) operates the devices 121-126A, 131A-136A in a gating pattern to provide the desired pulse width modulated drive signals. A gating pattern is the sequence in turning switching devices off (non-conducting) and on (conducting) to provide the desired drive signals, amplitude and frequency, to the load. The device 121A-126A and 131A-136A are susceptible to damage when a transient event occurs on the supply line side.

Accordingly, it is desired to protect the devices during such an event by preventing the devices from changing state as much as possible to avoid the high stress imposed on the devices during a transient event. The driver protector 107 determines a transient event as described herein and places the voltage source inverter 105A in a protection mode. In one protection mode, the rectifier devices 121A-126A are turned off. In one protection mode, the inverter devices 131A-136A are turned off.

The present protection scheme described herein is particularly suited to protection of the power application rated, semiconductor devices used in pulse-width modulated drives as the semiconductor devices used in these drives are more delicate in nature than prior drive switches. The drive, in an option, is a current-source rectifier drive with symmetrical gate commutated thyristors.

When the above description at various places refers to discrete electrical components, it is within the scope of the present invention to implement embodiments of the present invention in software. It is further a further aspect of the present invention to include machine readable media, such as computer memory, hard drives, optical storage, magnetic storage and the like which stores code for performing steps and operations of the present disclosure within the scope of the present invention.

I claim:

1. A pulse width modulated, adjustable speed drive, comprising:
   an input filter connected to a power source;
   a rectifier connected to the input filter;
   an inverter connected to a motor;
   a dc link connecting the rectifier to the inverter; and
   a controller operably connected to the rectifier and the inverter, the controller including a drive protection unit connected to the power source and to sense transient events from the power source by converting a power signal to a vector representation and filtering the vector representation, the drive protection unit to place the rectifier and the inverter in protection mode when a transient event occurs.

2. The drive of claim 1, wherein the protection mode includes both the rectifier and the inverter in a freewheel mode.

3. The drive of claim 2, wherein the drive protection unit always places the rectifier in freewheel mode before the inverter.

4. The drive of claim 3, wherein the drive protection unit to return the rectifier and the inverter to a normal operation mode after power from the transient event has dissipated.

5. A pulse width modulated, adjustable speed drive comprising:
   an input filter connected to a power source;
   a rectifier connected to the input filter;
   an inverter connected to a motor;
   a dc link connecting the rectifier to the inverter;
   a controller operably connected to the rectifier and the inverter, the controller including a drive protection unit connected to the power source and to sense transient events from the power source, the drive protection unit being to place the rectifier and the inverter in protection mode when a transient event occurs;

wherein the protection mode includes both the rectifier and the inverter in a freewheel mode;

wherein the drive protection unit always places the rectifier in freewheel mode before the inverter;

wherein the drive protection unit is to return the rectifier and the inverter to a normal operation mode after power from the transient event has dissipated;

wherein the drive protection unit returns the rectifier to normal operation before the inverter is in a regeneration mode.

6. The drive of claim 5, wherein the drive protection unit returns the inverter to normal operation before the rectifier in a motoring mode.

7. The drive of claim 1, wherein the rectifier includes a plurality of symmetrical gate commutated thyristors.

8. The drive of claim 7, wherein the inverter includes a plurality of symmetrical gate commutated thyristors.

9. The drive of claim 8, wherein the controller is operably connected to the symmetrical gate commutated thyristors of both the rectifier and the inverter to control conduction state of the thyristors.

10. The drive of claim 1, wherein the protection mode includes the rectifier in a freewheel mode and the inverter in a phase-shifted, pulse-width-modulated mode.

11. A pulse width modulated, adjustable speed drive, comprising:
an input filter connected to a power source;
a rectifier connected to the input filter;
an inverter connected to a motor;
a dc link connecting the rectifier to the inverter; and
a controller operably connected to the rectifier and the inverter, the controller including a drive protection unit connected to the power source, the drive protection unit to sense transient events from the power source, the drive protection unit to place the rectifier and the inverter in protection, freewheeling mode when a transient event occurs, the drive protection unit to return the rectifier to normal operation before the inverter is in a regeneration mode.

12. The drive of claim 11, wherein the protection mode includes both the rectifier and the inverter in a freewheel mode.

13. The drive of claim 11, wherein the drive protection unit always places the rectifier in a freewheel mode before the inverter is placed in a freewheel mode.

14. The drive of claim 11, wherein the drive protection unit is adapted to return the rectifier and the inverter to a normal operation mode after power from the transient event has dissipated.

15. The drive of claim 11, wherein the protection mode includes the rectifier in a freewheel mode and the inverter in a phase-shifted, pulse-width-modulated mode.

16. The drive of claim 11, wherein the drive protection unit is adapted to sample the power signal at at least 4 kHz.

17. The drive of claim 5, wherein the drive protection unit is to sample a power signal at at least 4 kHz.

18. The drive of claim 1, wherein the drive protection unit includes a vector rotator to transfer a monitored power signal into the vector representation.

19. The drive of claim 18, wherein the drive protection unit includes a high pass filter to remove a fundamental component of the power signal such that a nonfundamental component passes the filter.

20. The drive of claim 19, wherein the drive protection unit includes a rectifier adapted to rectify the nonfundamental component.

21. The drive of claim 20, wherein the drive protection unit includes a peak detector to determine a steady state amount of rectified nonfundamental component.

22. The drive of claim 21, wherein the drive protection unit includes a low pass filter adapted to output a steady state nonfundamental signal.

23. The drive of claim 22, wherein the drive protection unit includes a multiplier to scale the steady state nonfundamental signal.

24. The drive of claim 23, wherein the drive protection unit is to correct the steady state nonfundamental signal for current demand by motor receiving the output signal.

25. The drive of claim 24, wherein the circuit protector is to compare the correct steady state nonfundamental signal to the rectified nonfundamental component.

26. The drive of claim 25, wherein the drive protection unit is to detect nonfundamentals on a medium voltage utility line.

27. The drive of claim 26, wherein the drive protection unit is to sample the power signal at at least 4 kHz.

* * * * *